(12) United States Patent
Cunningham

(10) Patent No.: US 12,551,160 B2
(45) Date of Patent: Feb. 17, 2026

(54) SYSTEM AND METHOD FOR MEASURING HUMAN MILK PRODUCTION

(71) Applicant: NFANT Labs LLC, Marietta, GA (US)

(72) Inventor: Thomas J. Cunningham, Smyrna, GA (US)

(73) Assignee: NFANT Labs, Inc., Port Richey, FL (US)

(*) Notice: Subject to any disclaimer, the term of this patent is extended or adjusted under 35 U.S.C. 154(b) by 761 days.

(21) Appl. No.: 17/870,497

(22) Filed: Jul. 21, 2022

(65) Prior Publication Data

US 2023/0022106 A1   Jan. 26, 2023

Related U.S. Application Data

(60) Provisional application No. 63/224,851, filed on Jul. 22, 2021.

(51) Int. Cl.
*A61B 5/00* (2006.01)
*A61B 5/01* (2006.01)
(Continued)

(52) U.S. Cl.
CPC .............. *A61B 5/4288* (2013.01); *A61B 5/01* (2013.01); *A61B 5/0535* (2013.01); *A61B 5/11* (2013.01);
(Continued)

(58) Field of Classification Search
CPC ....... A61B 5/4288; A61B 5/01; A61B 5/0535; A61B 5/11; A61B 5/6804;
(Continued)

(56) References Cited

U.S. PATENT DOCUMENTS

| 6,339,722 B1 | 1/2002 | Heethaar et al. |
| 2007/0289536 A1* | 12/2007 | Dunn ............... A01J 5/0138 119/14.14 |

(Continued)

FOREIGN PATENT DOCUMENTS

| WO | 2014087343 A1 | 6/2014 |
| WO | 2021263091 A1 | 12/2021 |

OTHER PUBLICATIONS

Gardner et al., "Detection of Milk Ejection Using Bioimpedance Spectroscopy in Lactating Women during Milk Expression Using an Electric Breast Pump", Journal of Mammary Gland Biology and Neoplasia, p. 177-184, Feb. 13, 2019.

(Continued)

*Primary Examiner* — May A Abouelela
(74) *Attorney, Agent, or Firm* — Quinn IP Law

(57) ABSTRACT

A breast milk flow monitoring system in the form of a milk flow monitoring sensor is described and includes an array of electrodes and a controller. The electrodes include electrically conductive surfaces that are arranged to contact a skin surface of a breast. The controller generates a first excitation signal that is communicated via the first electrode to a first location on the breast, and generates a second excitation signal that is communicated via the first electrode to the first location on the breast. The controller receives a first current response signal and a second current response signal. A bio-impedance spectroscopic analysis of the first current response signal and the second current response signal is executed, wherein the bio-impedance spectroscopic analysis is calibrated for breast milk flow. A breast milk flow parameter is determined based upon the bio-impedance spectroscopic analysis.

20 Claims, 7 Drawing Sheets

(51) Int. Cl.
    *A61B 5/0535* (2021.01)
    *A61B 5/11* (2006.01)
(52) U.S. Cl.
    CPC .... *A61B 5/6804* (2013.01); *A61B 2562/0219* (2013.01); *A61B 2562/0271* (2013.01); *A61B 2562/046* (2013.01); *A61B 2562/066* (2013.01)
(58) Field of Classification Search
    CPC .... A61B 2562/0219; A61B 2562/0271; A61B 2562/046; A61B 2562/066
    See application file for complete search history.

(56) References Cited

U.S. PATENT DOCUMENTS

| | | | |
|---|---|---|---|
| 2008/0077042 A1* | 3/2008 | Feldkamp | A61B 5/4312 600/547 |
| 2009/0012433 A1* | 1/2009 | Fernstrom | A61B 5/0022 600/593 |
| 2009/0025484 A1* | 1/2009 | Springer | A01J 5/01 119/14.01 |
| 2009/0025485 A1* | 1/2009 | Krone | G01F 1/86 119/14.08 |
| 2009/0076405 A1 | 3/2009 | Amurthur et al. | |
| 2010/0217148 A1* | 8/2010 | Binder | A61B 5/4312 600/547 |
| 2010/0292604 A1* | 11/2010 | Kapon | A61B 5/4312 600/547 |
| 2015/0374256 A1 | 12/2015 | Skrabal | |
| 2017/0071552 A1 | 3/2017 | Harpe et al. | |
| 2017/0347923 A1* | 12/2017 | Roh | A61B 5/6831 |
| 2018/0338716 A1* | 11/2018 | Rajala | A61B 5/4288 |
| 2020/0082942 A1* | 3/2020 | Bourquin | A61M 1/068 |
| 2020/0100721 A1* | 4/2020 | Gozen | A61B 5/01 |
| 2020/0121241 A1* | 4/2020 | Hafezi | A61B 5/7475 |
| 2020/0146613 A1* | 5/2020 | Bourquin | A61B 5/6898 |
| 2021/0169398 A1* | 6/2021 | Sorgini | G01F 1/69 |
| 2022/0087594 A1* | 3/2022 | Shechter Ushpizin | A61B 5/4288 |
| 2022/0128950 A1 | 4/2022 | Trapero | |

OTHER PUBLICATIONS

Stupin et al., "Bio-Impedance Spectroscopy: Basics and Applications", Bio-Impedance Spectroscopy: Basics and Applications, p. 1-34, Jan. 2020.
The extended European search report for EP22846660, dated May 14, 2025.
Hazel et al., "Changes in capacitance are associated with milk removal from the breast", vol. 13, No. 12, Dec. 7, 2018.
Hazel et al., "Detection of Milk Ejection Using Bioimpedance Spectroscopy in Lactating Women during Milk Expression, Using an Electric Breast Pump", Journal of Mammary Gland Biology and Neoplasia, Plenum Press, New York, US, vol. 24, No. 2, Feb. 13, 2019.
Stupin et al., "Bioimpedance Spectroscopy: Basics and Applications", ACS Biomaterials Science & Engineering, vol. 7, No. 6, Mar. 22, 2021.
Gardner, H., The Detection and Physiological Changes Associated with Milk Ejection and Milk Removal in Lactating Women, Jan. 2020, The University of Western Australia School of Molecular Sciences.
Gardner et al., "Changes in R0/R[infinity] ratio and membrane capacitance are associated with milk removal from the breast", PLOS ONE, Dec. 7, 2018, p. 1-12.

* cited by examiner

SYSTEM AND METHOD FOR MEASURING HUMAN MILK PRODUCTION

CROSS-REFERENCE TO RELATED APPLICATIONS

This application claims the benefit of U.S. Provisional Patent Application No. 63/224,851, filed on Jul. 22, 2021, the disclosure of which is hereby incorporated by reference.

INTRODUCTION

Milk production output during lactation is a critical parameter for infant nutrition and growth. Known methods employed for measuring of milk output include monitoring secondary parameters, such as infant weigh-back protocols. However, such methods are inconvenient, difficult to implement, and provide slow and low resolution measurements.

There remains a need for reliable information related to the breastfed infant's nutrition, without compromising the mother's or baby's convenience and health.

SUMMARY

The concepts described herein generally relate to systems, devices, and methods for dynamically monitoring expressed milk flow from a breast during infant feeding or pumping.

An aspect of the disclosure may include a breast milk flow monitoring system, in the form of a milk flow monitoring sensor including an array of electrodes including a first electrode, a second electrode, a third electrode and a fourth electrode; and a controller. The first, second, third, and fourth electrodes include electrically conductive surfaces that are arranged to contact a skin surface of a breast. The controller is in communication with the first, second, third, and fourth electrodes; and is operative to generate a first excitation signal that is communicated via the first electrode to a first location on the breast, generate a second excitation signal that is communicated via the first electrode to the first location on the breast, receive, via one of the second, third or fourth electrodes, a first current response signal in response to the first excitation signal, receive, via the one of the second, third or fourth electrodes, a second current response signal in response to the second excitation signal, and execute a bio-impedance spectroscopic analysis of the first excitation signal, the second excitation signal, the first current response signal, and the second current response signal, wherein the bio-impedance spectroscopic analysis is calibrated for breast milk flow. A breast milk flow parameter is determined based upon the bio-impedance spectroscopic analysis.

An aspect of the disclosure may include the first excitation signal being a low frequency excitation signal, and wherein the second excitation signal is a high frequency excitation signal.

Another aspect of the disclosure may include the controller operative to determine a ratio of the first current response signal and the second current response signal; and execute a bio-impedance spectroscopic analysis of the ratio of the first current response signal and the second current response signal, wherein the bio-impedance spectroscopic analysis is calibrated for breast milk flow.

Another aspect of the disclosure may include the controller operative to execute a Fourier transform analysis of the bio-impedance spectroscopic analysis of the ratio of the first current response signal and the second current response signal to determine the breast milk flow parameter.

Another aspect of the disclosure may include the controller operative to execute a frequency response analysis of the bio-impedance spectroscopic analysis of the ratio of the first current response signal and the second current response signal to determine the breast milk flow parameter.

Another aspect of the disclosure may include the controller operative to execute an adaptive filter analysis of the bio-impedance spectroscopic analysis of the ratio of the first current response signal and the second current response signal to determine the breast milk flow parameter.

Another aspect of the disclosure may include the controller operative to determine a first parameter associated with at least one of impedance (z), reactance (Xc), resistance (R), and phase (Ph) for the first current response signal; determine a second parameter associated with at least one of impedance (z), reactance (Xc), resistance (R), and phase (Ph) for the second current response signal; determine a ratio of the first parameter and the second parameter; and determine the breast milk flow parameter based upon the ratio of the first parameter and the second parameter.

Another aspect of the disclosure may include the low frequency excitation signal being less than the high frequency excitation signal, wherein the high frequency excitation signal is less than 1000 KHz, and wherein the low frequency excitation signal is greater than 3 KHz.

Another aspect of the disclosure may include the low frequency excitation signal being a single frequency sine wave having a frequency of less than 50 kHz.

Another aspect of the disclosure may include the high frequency excitation signal being a single frequency sine wave having a frequency between 50 kHz and 1000 kHz.

Another aspect of the disclosure may include the low frequency excitation signal being a single frequency sine wave having a frequency of less than 50 kHz.

Another aspect of the disclosure may include the high frequency excitation signal being a single frequency sine wave having a frequency between 50 kHz and 1000 kHz.

Another aspect of the disclosure may include the first excitation signal being a first broad spectrum sine wave, and wherein the second excitation signal is a second broad spectrum sine wave.

Another aspect of the disclosure may include the first electrode being arranged to contact the surface of the breast at one of a superomedial location distal to an areola, an inferomedial location distal to the areola, an inferolateral location distal to the areola, a superolateral location distal to the areola, a superomedial location proximal to the areola, an inferomedial location proximal to the areola, an inferolateral location proximal to the areola, or a superolateral location proximal to the areola, and the second electrode being arranged to contact the surface of the breast at another of the superomedial location distal to the areola, the inferomedial location distal to the areola, the inferolateral location distal to the areola, the superolateral location distal to the areola, the superomedial location proximal to the areola, the inferomedial location proximal to the areola, the inferolateral location proximal to the areola, or the superolateral location proximal to the areola.

Another aspect of the disclosure may include the third electrode being arranged to contact the surface of the breast at one of a superomedial location distal to an areola, an inferomedial location distal to the areola, an inferolateral location distal to the areola, a superolateral location distal to the areola, a superomedial location proximal to the areola, an inferomedial location proximal to the areola, an inferolateral location proximal to the areola, or a superolateral location proximal to the areola, and the fourth electrode being arranged to contact the surface of the breast at another of the superomedial location distal to the areola, the inferomedial location distal to the areola, the inferolateral location distal to the areola, the superolateral location distal to the areola, the superomedial location proximal to the areola, the inferomedial location proximal to the areola, the inferolateral location proximal to the areola, or the superolateral location proximal to the areola.

Another aspect of the disclosure may include the first electrode, the second electrode, the third electrode and the fourth electrode being affixed to a flexible substrate.

Another aspect of the disclosure may include a conformable holder, wherein the milk flow monitoring sensor is affixed onto the conformable holder; and wherein the conformable holder is arranged to position the first electrode, the second electrode, the third electrode and the fourth electrode in contact with the skin surface of the breast.

Another aspect of the disclosure may include a temperature sensor being affixed onto the conformable holder and arranged to monitor a temperature of the breast; wherein the controller is operative to receive an input signal from the temperature corresponding to the temperature of the breast, and determine the breast milk flow parameter based upon the bio-impedance spectroscopic analysis of the first excitation signal, the second excitation signal, the first current response signal, the second current response signal, and the temperature of the breast.

Another aspect of the disclosure may include a movement sensor affixed onto the conformable holder and arranged to monitor physical motion; wherein the controller is operative to: receive an input signal from the movement sensor associated with physical motion proximal to the sensor, and determine the breast milk flow parameter based upon the bio-impedance spectroscopic analysis of the first excitation signal, the second excitation signal, the first current response signal, the second current response signal, and the physical motion.

Another aspect of the disclosure may include the movement sensor being an accelerometer.

Another aspect of the disclosure may include the movement sensor being a plurality of accelerometers, wherein the plurality of accelerometers correspond to the first, second, third, and fourth electrodes.

Another aspect of the disclosure may include one of the plurality of accelerometers being arranged to monitor a gross body movement, and wherein one of the plurality of accelerometers is arranged to monitor breast movement.

Another aspect of the disclosure may include a strain gage affixed onto the conformable holder proximal to the skin surface of the breast; wherein the controller is operative to receive an input signal from the strain gage, and determine the breast milk flow parameter based upon the bio-impedance spectroscopic analysis of the first excitation signal, the second excitation signal, the first current response signal, the second current response signal, and the input signal from the strain gage.

Another aspect of the disclosure may include a cellular device including an executable application, the cellular device being in communication with a cloud environment; wherein the cellular device is configured to receive the breast milk flow parameter from the controller, wherein the cellular device is configured to communicate the breast milk flow parameter to the cloud environment, and wherein the cellular device is configured to visually display the breast milk flow parameter.

Another aspect of the disclosure may include breast milk flow monitoring system that includes a milk flow monitoring sensor including an array of electrodes including a first electrode, a second electrode, a third electrode and a fourth electrode; and a controller; wherein the first, second, third, and fourth electrodes include electrically conductive surfaces that are arranged to contact a skin surface of a breast; wherein the controller is in communication with the first, second, third, and fourth electrodes; and wherein the controller is operative to: generate a first excitation signal that is communicated via the first electrode to a first location on the breast, wherein the first excitation signal is calibrated for breast milk flow, generate a second excitation signal that is communicated via the first electrode to the first location on the breast, wherein the second excitation signal is calibrated for breast milk flow, receive, via one of the second, third or fourth electrodes, a first current response signal in response to the first excitation signal, receive, via the one of the second, third or fourth electrodes, a second current response signal in response to the second excitation signal, execute a bio-impedance spectroscopic analysis of the first excitation signal, the second excitation signal, the first current response signal, and the second current response signal, wherein the bio-impedance spectroscopic analysis is calibrated for breast milk flow, and determine a breast milk flow parameter based upon the bio-impedance spectroscopic analysis.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
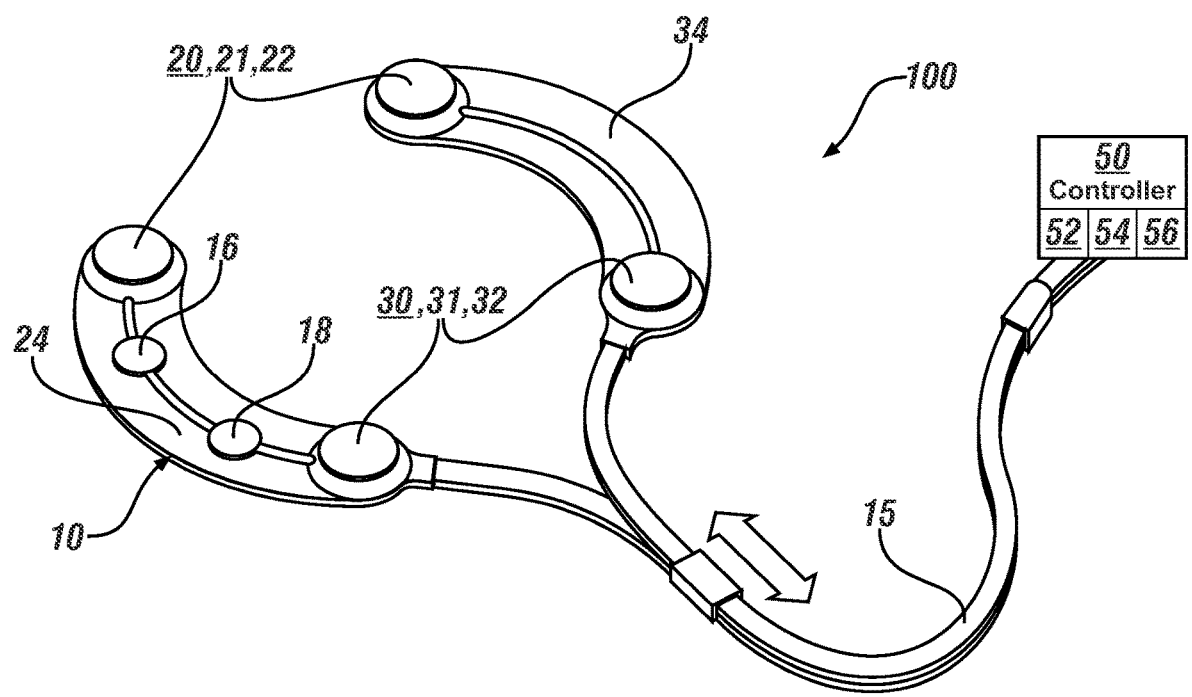
FIG. 1 schematically illustrates elements of a breast milk flow monitoring system that includes a milk flow monitoring sensor in communication with a controller, with the controller being in communication with a user application and/or a cloud environment, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Furthermore, the drawings are in simplified form. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Embodiments may be described herein in terms of functional and/or logical block components and various processing steps. Such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the embodiments may be practiced in conjunction with any number of mechanical and/or electronic systems.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. Many alternative or additional functional relationships or physical connections may be present in an embodiment.

The concepts described herein provide for a breast milk flow monitoring system that includes a milk flow monitoring sensor that is composed of one or a plurality of electrode pairs, or an electrode array, and a controller. The electrode pair(s) may communicate with the controller via a wiring harness that includes one or more cables. In some embodiments, the milk flow monitoring sensor also includes a temperature sensor and/or a movement sensor, e.g., an inertial monitoring unit (IMU) that incorporates one or multiple accelerometers.

The breast milk flow monitoring system employs the controller and the milk flow monitoring sensor to measure the resistance between the electrodes that is due to tissue or subcutaneous fluid under the skin, mammary glands, and milk contained within employing bio-impedance spectroscopic analysis. Bio-impedance relates to a measure of resistance of living tissue in response to an externally applied electric current.

As milk flows, is ejected, sucked or expressed out of the breast, bioimpedance values change in relation to fluid leaving the breast. Bioimpedance values can be calibrated to indicate fluid levels of milk in the breast, and the amount of milk that has left the breast via pumping or feeding by an infant, and also to indicate milk replenishment in the breast between feedings.

Each electrode pair of the milk flow monitoring sensor has a first electrode for sending an excitation signal and a second electrode for receiving a current response signal. Each electrode array of the milk flow monitoring sensor has a first electrode for sending an excitation signal and one or multiple electrodes for receiving a current response signal. Each electrode includes an electrically conductive surface for contact with a skin surface of a breast. The controller is operative to generate the excitation signal, which is communicated via the first electrode to the breast. The excitation signal is calibrated for breast milk flow. The controller receives, via the second electrode, a current response signal in response to the excitation signal, and executes bio-impedance spectroscopic analysis using the excitation signal and the current response signal. The bio-impedance spectroscopic analysis is calibrated for breast milk flow. The controller determines a breast milk flow parameter based upon the bio-impedance spectroscopic analysis.

The process of generating the excitation signal, receiving the current response signal, and executing the bio-impedance spectroscopic analysis may be repeated multiple times during an infant feeding event.

The breast milk flow monitoring system may be activated by some form of triggering mechanism, including but not limited to pressing a button on the controller, or voice activation.

The electrodes of the milk flow monitoring sensor may be embedded, adhered to, or otherwise physically attached to a holder that is formed from a material that has been molded in a shape to be fitted on and capable of direct contact with a portion of a surface of a breast, such as being positioned on a breast, onto a breast, attached to the breast, placed between the breast and a brassiere or bra, a breast shield, breast pump funnel, or otherwise operatively attached to the surface skin of the breast. The base material of the holder may be silicon or another inert, non-reactive material for placement on the skin.

Referring now to the drawings, which are provided for the purpose of illustrating certain embodiments only and not for the purpose of limiting the same, FIG. 1 schematically illustrates elements of a breast milk flow monitoring system 100 that includes a milk flow monitoring sensor 10 that is in communication with a controller 50 that is capable of processing signals from the milk flow monitoring sensor 10 and executing a bio-impedance spectroscopic analysis to determine a breast milk flow parameter. The controller 50 includes input/output and signal processing circuitry 52, a memory device 54 storing one or a plurality of executable algorithms, collected data and one or multiple calibrations, and a processor 56.

Alternatively, or in addition, the breast milk flow monitoring system 100 may be calibrated to account for extracellular and intracellular fluid movement in the breast other than milk, which fluids may include water or blood, with such movement being associated with breast milk flow.

The milk flow monitoring sensor 10 includes, in one embodiment, an array of sensors in the form of first and second electrode pairs 20, 30, respectively, which may be arranged on flexible substrates 24, 34, respectively, which may be placed in a conformable holder (not shown in FIG. 1). As shown, the milk flow monitoring sensor 10 employs two electrode pairs 20, 30. Alternatively, the milk flow monitoring sensor 10 may employ a single electrode pair. Alternatively, the milk flow monitoring sensor 10 may employ three electrode pairs, four electrode pairs, five electrode pairs, etc., without limitation. Alternatively, the milk flow monitoring sensor 10 may employ three, four, five, six, etc. electrodes that are arranged singly.

The first electrode pair 20 includes a first electrode 21 and a second electrode 22, and the second electrode pair 30 includes a third electrode 31 and a fourth electrode 32.

The first electrode 21, second electrode 22, third electrode 31, and fourth electrode 32 are arranged to have direct contact with a skin surface of a lactating breast to maximize surface contact and maximize signal coupling and conductivity to the skin surface. The direct contact between the respective electrode and the proximal skin surface may be via a dry contact, or via an intervening conductive gel.

The first electrode 21, second electrode 22, third electrode 31, and fourth electrode 32 are arranged to contact with, attach to, or otherwise interface with skin to send and/or receive electrical signals, and may be fabricated from stainless steel, silver, metal alloys, or other material without limitation. The first electrode 21, second electrode 22, third electrode 31, and fourth electrode 32 may be dry electrodes, wet electrodes, semi-dry electrodes, or combinations thereof.

Each of the first electrode 21, second electrode 22, third electrode 31, and fourth electrode 32 is in communication with the controller 50. In one embodiment and as shown, the first electrode 21, second electrode 22, third electrode 31, and fourth electrode 32 communicate with the controller 50 via an electrical cable 15. Alternatively, one or more of the first electrode 21, second electrode 22, third electrode 31, and fourth electrode 32 may communicate wirelessly with the controller 50.

The flexible substrate 24 includes the first electrode 21 and the third electrode 31, and the flexible substrate 34 includes the second electrode 22 and fourth electrode 32 in one embodiment.

In one embodiment, the milk flow monitoring sensor 10 includes a temperature sensor 18 that is arranged on one of the flexible substrates 24, 34 to have direct contact with the skin surface of the lactating breast.

In one embodiment, the milk flow monitoring sensor 10 includes a movement sensor 16. In one embodiment, the movement sensor 16 is an inertial measurement unit (IMU) including one or multiple accelerometers, which is arranged on one of the flexible substrates 24, 34 to have direct contact with the skin surface of the lactating breast. In one embodiment, a single movement sensor 16 may be employed. In one embodiment, a plurality of movement sensors 16 may be employed, wherein the plurality of movement sensors 16 are implemented adjacent to or integral to one of the first electrode 21, second electrode 22, third electrode 31, and fourth electrode 32. The movement sensor 16 may be a piezoelectric accelerometer, a piezoresistive film, or another motion sensing device capable of sensing vibration, movement artifacts, etc., without limitation.

The movement sensor 16 monitors physical movement of the breast, which may be a movement artifact that is indicative of an infant nursing or of breast pumping. When a plurality of movement sensors 16 are employed, they may be arranged, configured, and/or calibrated to measure different movements. By way of a non-limiting example, a first of the plurality of movement sensors 16 may be arranged on the holder to monitor gross body movement of the nursing mother, a second of the plurality of movement sensors 16 may be arranged to monitor movement of the breast as a result of nursing, and other(s) of the plurality of movement sensors 16 may be arranged to monitor other vibrations and/or movements.

The milk flow monitoring sensor 10 has minimal components, may be arranged to be non-intrusive to the nipple area of the breast and thus not interfere with a nursing infant. Positioning of the milk flow monitoring sensor 10 on a breast is flexible, thus being adaptable to a range of breast sizes and configurations. Furthermore, the milk flow monitoring sensor 10 may be used with a nipple shield or other devices. Example locations for positioning the milk flow monitoring sensor 10 are illustrated and described with reference to FIG. 9.

As described in more detail herein, the controller 50 includes algorithms, calibrations, and other signal processing capabilities to generate one or multiple excitation signals that are communicated to the first electrode 21 of the first electrode pair 20 and the third electrode 31 of the second electrode pair 30. The controller 50 receives one or multiple current response signal(s) via the second electrode 22 of the first electrode pair 20 and the fourth electrode 32 of the second electrode pair 30. In one embodiment, a first excitation signal that is communicated to the first electrode 21 of the first electrode pair 20 may occur simultaneously with a second excitation signal that is communicated to the third electrode 31 of the second electrode pair 30. Alternatively, the first excitation signal that is communicated to the first electrode 21 of the first electrode pair 20 may alternate with the second excitation signal that is communicated to the third electrode 31 of the second electrode pair 30 in one embodiment.

In one embodiment, the controller 50 is operative to generate a first excitation signal that is communicated via the first electrode 21 to a first location on the breast, wherein the first excitation signal is calibrated for breast milk flow. The controller 50 receives, via one or more of the second electrode 22, the third electrode 31, and the fourth electrode 32, a first current response signal in response to the first excitation signal.

The controller 50 subsequently generates a second excitation signal that is communicated via the first electrode 21 to the first location on the breast, wherein the second excitation signal is also calibrated for breast milk flow. The controller 50 receives, via one or more of the second electrode 22, the third electrode 31, and the fourth electrode 32, a second current response signal in response to the first excitation signal.

In one embodiment, the first excitation signal is a low frequency excitation signal, and the second excitation signal is a high frequency excitation signal. In one embodiment, the low frequency excitation signal is a single frequency sine wave having a frequency of less than 50 kHz, and the high frequency excitation signal is a single frequency sine wave having a frequency between 50 kHz and 1000 kHz. Alternatively, the first excitation signal is a broad spectrum sine wave encompassing a low frequency range, and the second excitation signal is a broad spectrum sine wave encompassing a high frequency range.

The controller 50 executes a bio-impedance spectroscopic analysis of the first excitation signal, the second excitation signal, the first current response signal, and the second current response signal, wherein the bio-impedance spectroscopic analysis is calibrated for breast milk flow to determine a breast milk flow parameter. In one embodiment, this includes the controller 50 determining a ratio of the first current response signal and the second current response signal, and executing a bio-impedance spectroscopic analysis of the ratio of the first current response signal and the second current response signal, wherein the bio-impedance spectroscopic analysis is calibrated for breast milk flow to determine a breast milk flow parameter.

The bio-impedance spectroscopic analysis of the ratio of the first current response signal and the second current response signal may include determining a parameter associated with at least one of an impedance (z), a reactance (Xc), a resistance (R), and a phase (Ph) based upon the bio-impedance spectroscopic analysis of the ratio of the first current response signal and the second current response signal, and determining the breast milk flow parameter based upon the least one of the impedance (z), the reactance (Xc), the resistance (R), and the phase (Ph).

In one embodiment, the first excitation signal that is communicated to the first electrode 21 of the first electrode pair 20 may be in the form of a low frequency sinusoidal wave form that lasts less than 100 ms, wherein the low frequency waveform is less than 50 kHz. In one embodiment, the second excitation signal that is communicated to the second electrode 31 of the second electrode pair 30 may be in the form of a high frequency sinusoidal wave form that lasts less than 100 ms, wherein the high frequency waveform is between 50 kHz and 1000 kHz.

The first and second current response signals that are received via the second electrode 22, third electrode 31 and the fourth electric 32 represent electrical current(s) that has passed through the intervening breast tissue and skin tissue and originates from the first electrode. A temperature input from the temperature sensor 18 and a parameter associated with physical movement of the breast are also monitored, when available.

The controller 50 executes a bio-impedance spectroscopic analysis of the excitation signal(s) and the current response signal(s), wherein the bio-impedance spectroscopic analysis is calibrated for breast milk flow. The bio-impedance spectroscopic analysis calibrated for breast milk flow may include measuring the electrical current passing through the breast tissue at various frequencies of the excitation voltage in a form of electrical cell-substrate impedance sensing (ECIS), in one embodiment. The controller 50 then determines a breast milk flow parameter based upon the bio-impedance spectroscopic analysis. This operation may be executed multiple times during a single breastfeeding event.

Figure 2:
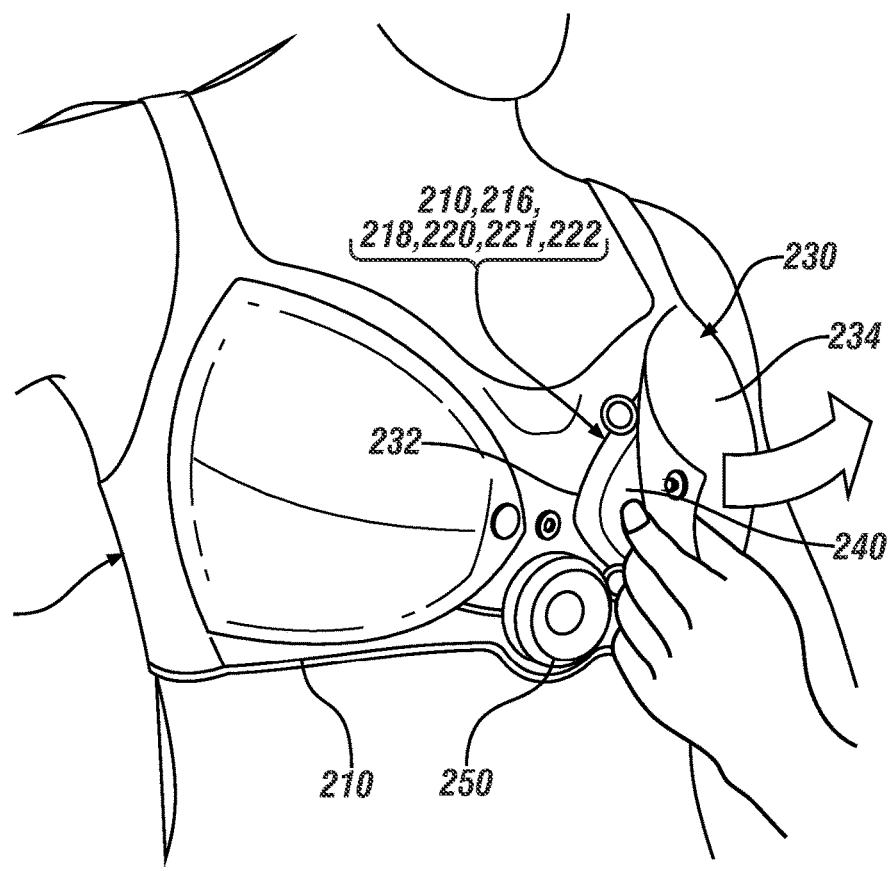
FIGS. 2 and 3 pictorially illustrate elements of a breast milk flow monitoring system that includes a milk flow monitoring sensor in communication with a controller, and affixed to an article of clothing, in accordance with the disclosure.
Figure 3:
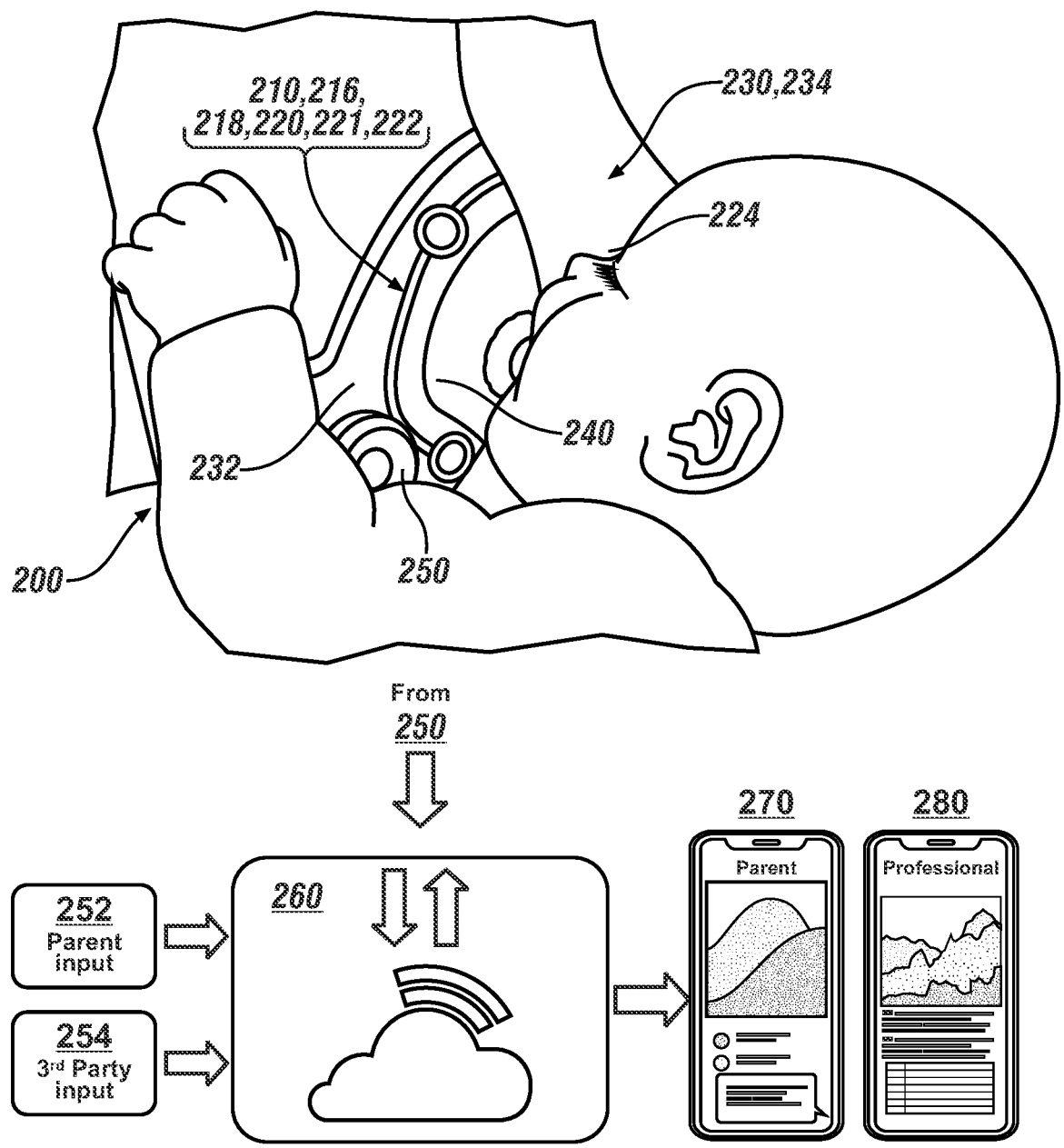

FIGS. 2 and 3 pictorially show elements of an embodiment of the milk flow monitoring sensor 210 including at least one electrode pair 220 and controller 250, and is analogous to the milk flow monitoring sensor 10 that is described with reference to FIG. 1. In one embodiment, the milk flow monitoring sensor 210 may include a temperature sensor 218 and/or one or a plurality of movement sensors 216 in one embodiment. Alternatively, or in addition, the milk flow monitoring sensor 210 may include one or a plurality of strain gages.

The milk flow monitoring sensor 210 is affixed to an article of wearable clothing, e.g., a nursing bra 200 in one embodiment. A nursing infant 224 is also illustrated. The nursing bra 200 includes a cradle portion 236 that supports cups 230 that are composed of cup frames 232 and detachable panels 234. The milk flow monitoring sensor 210 is affixed to each of the cup frames 232 at defined locations to facilitate placement of the electrode pair(s) 221, 222 so that they have direct physical contact with skin of a breast 240. The controller 250 is attachable to the cradle portion 236. The milk flow monitoring sensor 210 and controller 250 are detachable to facilitate laundering of the nursing bra 200. As illustrated, the milk flow monitoring sensor 210 is affixed to a right side of the nursing bra 200 for monitoring a right breast. A second milk flow monitoring sensor (not shown) would be affixed to a left side of the nursing bra 200 for monitoring a left breast, and communicate with the controller 250.

The controller 250 communicates information from the milk flow monitoring sensor 210, including a total milk flow mass or volume, body temperature, activity, time, date, duration of the feeding session, and other data. The nursing mother may add other information (Parent Input 252), such as the infant's weight post-feeding, weight change, condition of the infant (e.g., alert, sleepy, fussy, etc.), diaper status, and other information. There may also be other information communicated from a third party (3$^{rd}$ Party Input 254). Such information may include information from a present feeding session, historical data, diurnal analysis, trend data, comparative analysis, etc. The foregoing information may be subjected to analysis to identify trends, outliers, etc., and communicated via an application on a cell phone, tablet or other device to a parent via a parent-specific application (270). The foregoing information may be subjected to analysis to identify trends, outliers, etc., and communicated via an application on a cell phone, tablet or other device to a medical professional or another advisor via a professional-specific application (280). Analysis of the bio-impedance data may be executed in real-time and/or off-line. The bio-impedance data is captured during the milk expression and is pooled with other data, either in the controller 260 or in a cloud environment.

Figure 4:
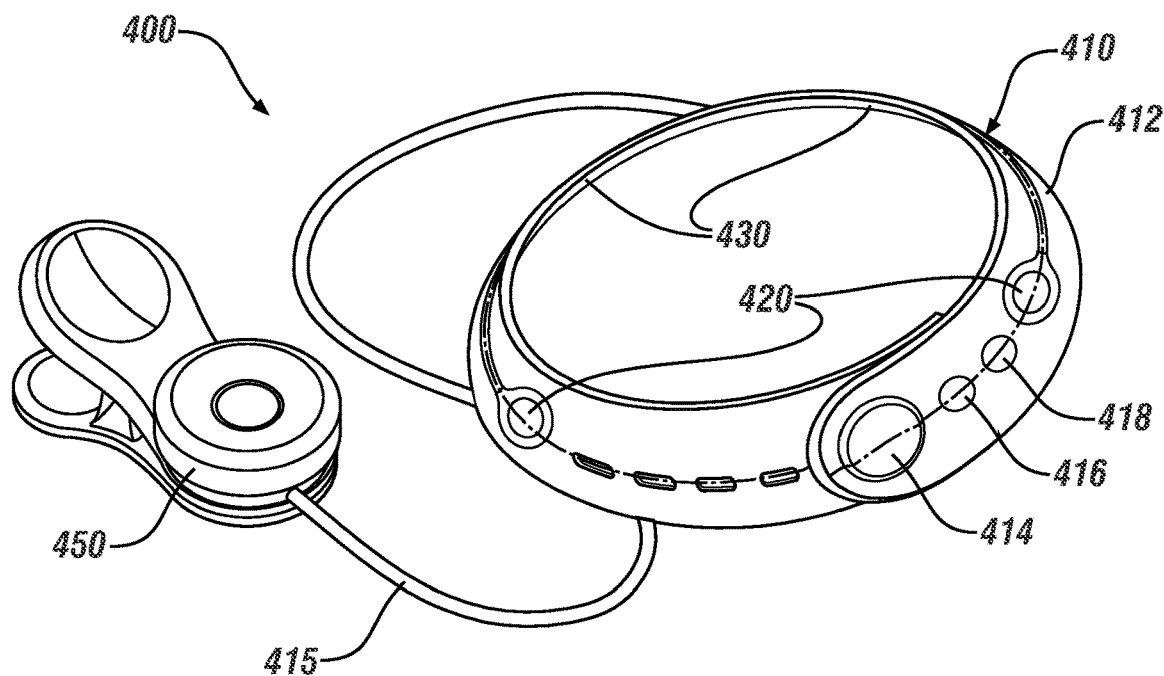
FIG. 4 pictorially illustrates an embodiment of a breast milk flow monitoring system that includes a milk flow monitoring sensor arranged on an adjustable band, in accordance with the disclosure.

FIG. 4 pictorially illustrates an embodiment of a breast milk flow monitoring system 400 that includes milk flow monitoring sensor 410 that is in communication with controller 450 via wiring cable 415, analogous to the breast milk flow monitoring system 100 that is described with reference to FIG. 1. In this embodiment, the milk flow monitoring sensor 410 is arranged on an adjustable band 412 that may be substantially conical in shape and with a fastener 414 to facilitate adjustment of the length and thus adjustment of the diameter of the adjustable band 412. The milk flow monitoring sensor 410 includes first and second electrode pairs 420, 430, respectively, with electrodes 421, 422, 431 and 432. In one embodiment, the milk flow monitoring sensor 410 may include a temperature sensor 418 and/or one or a plurality of movement sensors 416 in one embodiment.

Alternatively, or in addition, the milk flow monitoring sensor 410 may include one or a plurality of strain gages.

The capability to adjust the length and thus the diameter of the adjustable band 412 allows for adaptation of the milk flow monitoring sensor 410 to different breast sizes. The adjustable band 412 is fabricated from silicone or another material, using extrusion, molding, or other methods. The milk flow monitoring sensor 410 is configured to be placed directly onto the skin of the breast in an arrangement that enables the electrodes of the first and second electrode pairs 420, 430 to have direct contact with the skin of the breast, without interfering with infant feeding.

Figure 5:
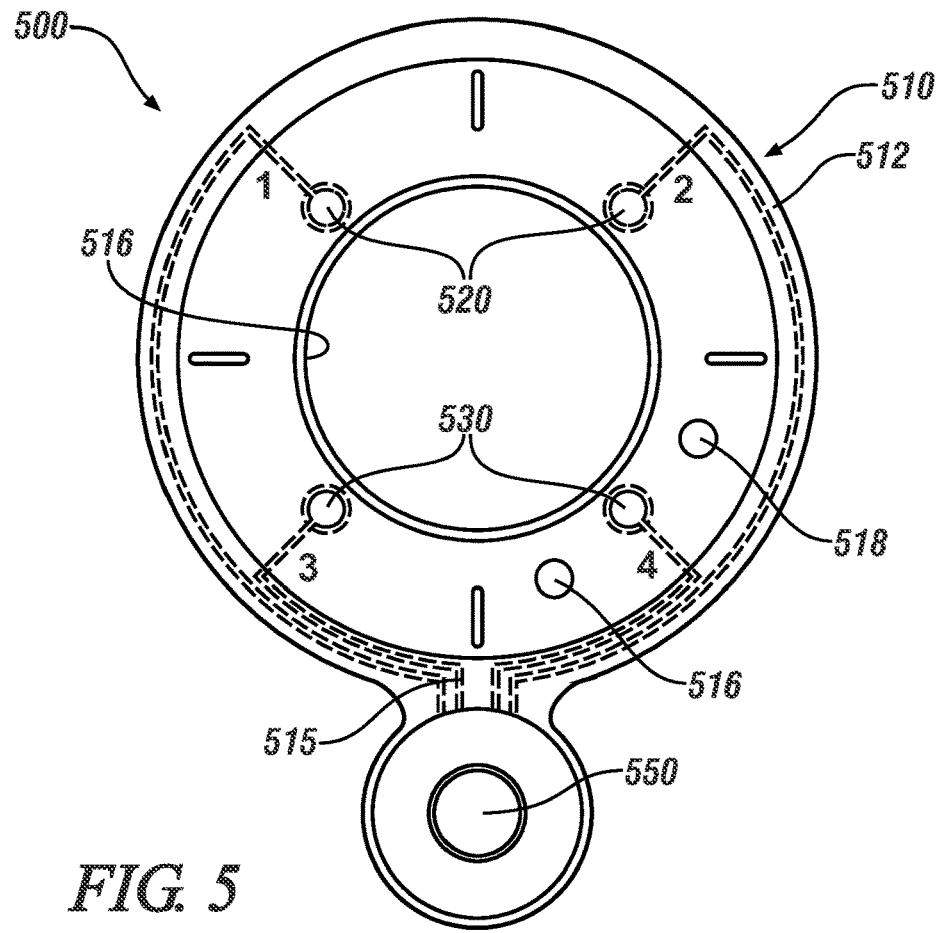
FIGS. 5 and 6 pictorially illustrate an embodiment of a breast milk flow monitoring system that includes a milk flow monitoring sensor arranged on a truncated conical holder, in accordance with the disclosure.
Figure 6:
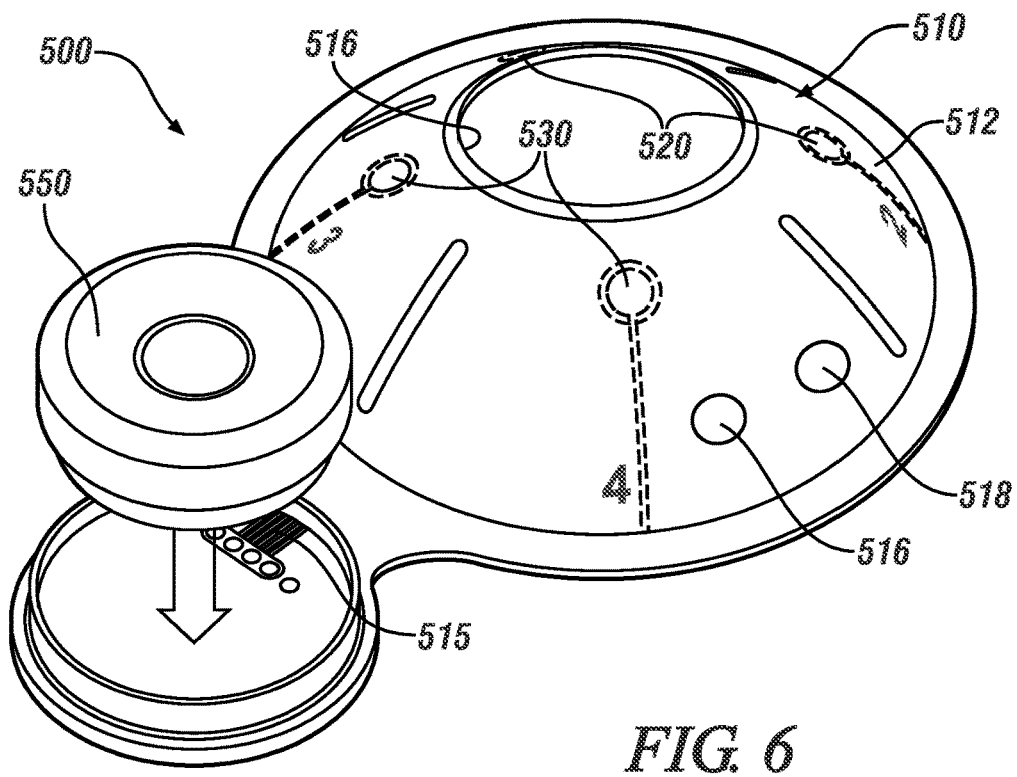

FIGS. 5 and 6 schematically illustrate an embodiment of a breast milk flow monitoring system 500 that includes milk flow monitoring sensor 510 that is in communication with controller 550 via wiring cable 515, analogous to the breast milk flow monitoring system 100 that is described with reference to FIG. 1. In this embodiment, the milk flow monitoring sensor 510 is arranged on a truncated conical holder 512 having an aperture 514 on a distal end. The aperture 514 provides an opening through which a nipple, areola, and a distal end of a breast may protrude, thus permitting infant feeding. The truncated conical holder 512 is fabricated from silicone or another flexible material, and may be formed by molding, extrusion or another forming method.

The milk flow monitoring sensor 510 includes first and second electrode pairs 520, 530, respectively, with electrodes 521, 522, 531 and 532. In one embodiment, the milk flow monitoring sensor 510 may include temperature sensor 518 and/or movement sensor 516. The electrodes 521, 522, 531 and 532, temperature sensor 518, and movement sensor 516 may be molded into, adhered to, or otherwise attached to the truncated conical holder 512 in a manner that enables contact with the breast skin at target locations.

Figure 7:
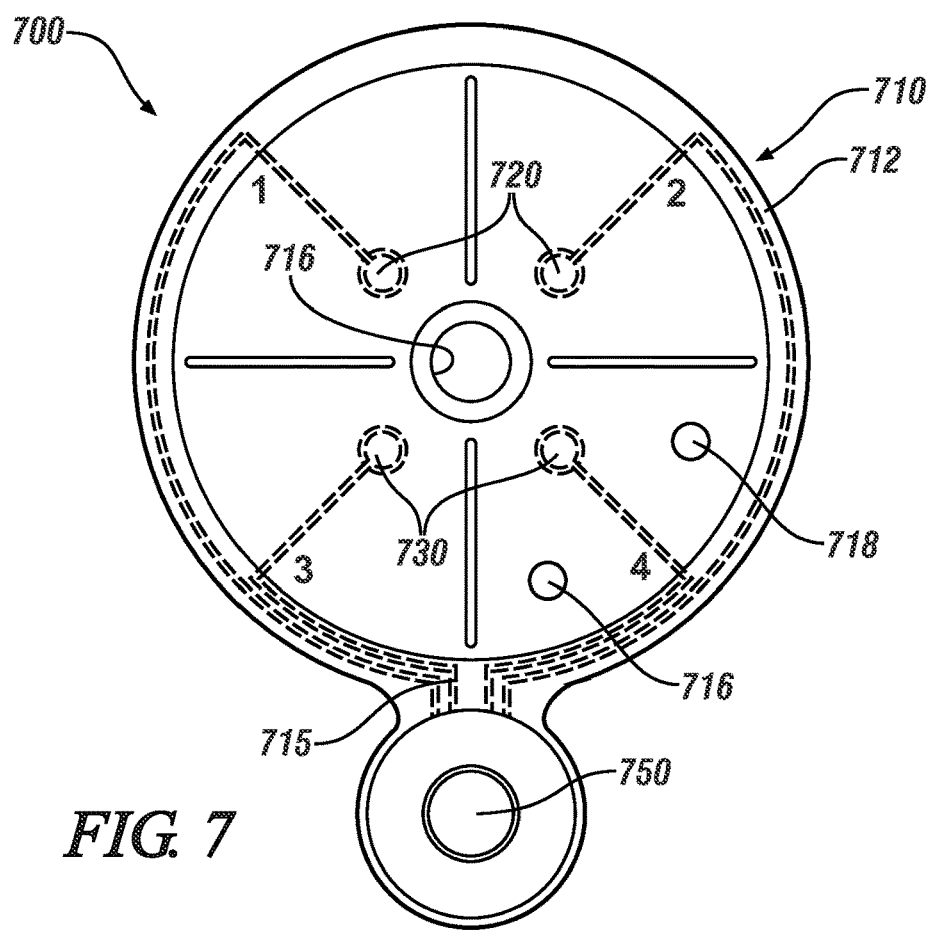
FIGS. 7 and 8 pictorially illustrate an embodiment of a breast milk flow monitoring system that includes a milk flow monitoring sensor arranged on a truncated conical holder, in accordance with the disclosure.
Figure 8:
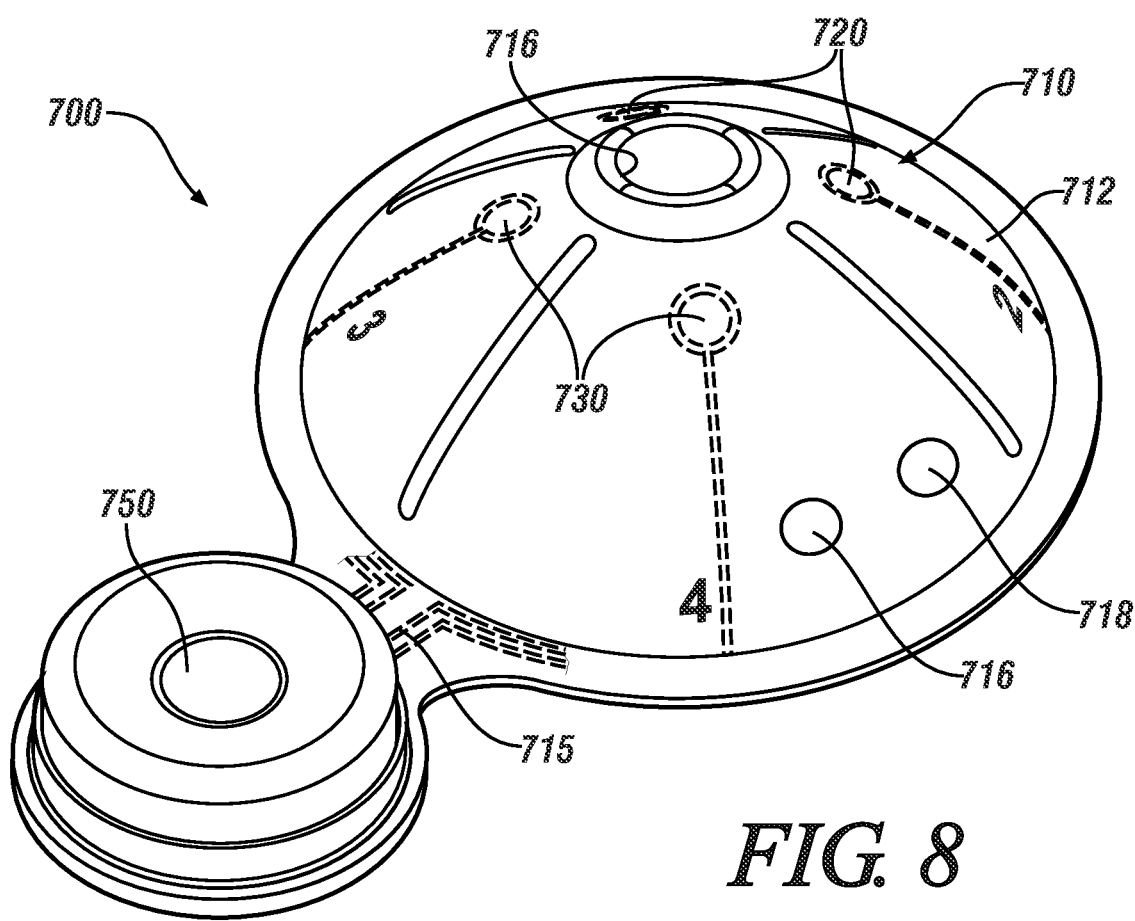

FIGS. 7 and 8 schematically illustrate an embodiment of a breast milk flow monitoring system 700 that includes milk flow monitoring sensor 710 that is in communication with controller 750 via wiring cable 715, analogous to the breast milk flow monitoring system 100 that is described with reference to FIG. 1. In this embodiment, the milk flow monitoring sensor 710 is arranged on a truncated conical holder 712 having an aperture 714 on a distal end. The aperture 714 provides an opening through which only a nipple may protrude, thus permitting infant feeding. The truncated conical holder 712 is fabricated from silicone or another flexible material.

The milk flow monitoring sensor 710 includes first and second electrode pairs 720, 730, respectively, with electrodes 721, 722, 731 and 732. In one embodiment, the milk flow monitoring sensor 710 may include temperature sensor 718 and/or movement sensor 716. The electrodes 721, 722, 731 and 732, temperature sensor 718, and movement sensor 716 may be molded into, adhered to, or otherwise attached to the conical holder 712 in a manner that enables contact with the breast skin at target locations. In one embodiment, the milk flow monitoring sensor 710 may include a temperature sensor 718 and/or one or a plurality of movement sensors 716 in one embodiment. Alternatively, or in addition, the milk flow monitoring sensor 710 may include one or a plurality of strain gages or piezoelectric sensors.

Figure 9:
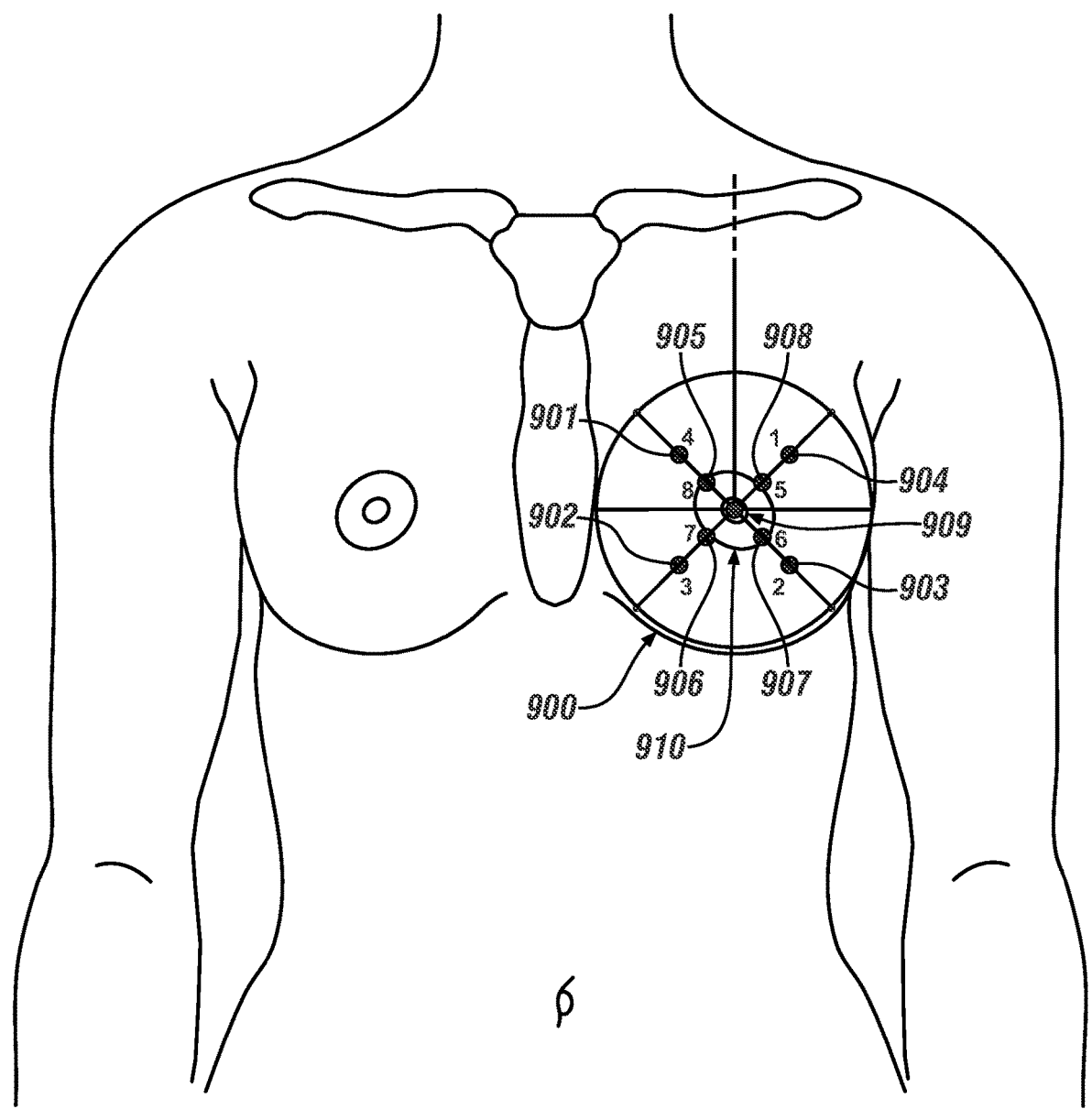
FIG. 9 pictorially illustrates a front view of a torso of a human female body for that includes a plurality of anatomical landmarks, in accordance with the disclosure.

FIG. 9 schematically illustrates a front view of a female torso including a breast 900 having a nipple 909 and an areola 910, and having a plurality of anatomical landmarks identified on the surface thereof. The anatomical landmarks describe potential target locations for the electrodes of an electrode pair or an electrode array that is employed by one of the embodiments of the milk flow monitoring sensor that is described herein. The anatomical landmarks include a superomedial location distal to an areola 901, an inferomedial location distal to an areola 902, an inferolateral location distal to an areola 903, a superolateral location distal to an areola 904, a superomedial location proximal to an areola 905, an inferomedial location proximal to an areola 906, an inferolateral location proximal to an areola 907, a superolateral location proximal to an areola 908. As used herein, the terms "distal" and "proximal" indicate the relative distance, on the skin surface of the breast, of the exemplary locations relative to the areola 910. For example, the proximal locations 905, 906, 907, 908 on the skin surface of the breast 900 are located closer to the areola 909 than the distal locations 901, 902, 903, 904 on the skin surface of the breast 900. The distal locations 901, 902, 903, 904 on the skin surface of the breast 900 are located further away from the areola 901 than the proximal locations 905, 906, 907, 908 on the skin surface of the breast 900. Furthermore, distances from the areola 901 for the proximal locations 905, 906, 907, 908 may all be the same in one embodiment. Alternatively, distances from the areola 901 may be different for individual ones of the proximal locations 905, 906, 907, 908. In like manner, distances from the areola 901 for the distal locations 901, 902, 903, 904 may all be the same in one embodiment. Alternatively, distances from the areola 901 may be different for individual ones of the distal locations 901, 902, 903, 904. Furthermore, the proximal locations 905, 906, 907, 908 and distal locations 901, 902, 903, 904 are shown as being oriented along lines of 45 degrees, 135 degrees, 225 degrees, and 315 degrees in relation to a common plane that is defined by being parallel to a chest wall, but the concepts for placement of the electrodes is not so limited. The placements may be at other orientations, determined during calibration or another event, to optimize or maximize signal integrity from the electrodes.

In one embodiment, the first electrode of the electrode pair or electrode array is arranged to contact the skin surface of the breast 900 at one of the superomedial location distal to the areola 901, the inferomedial location distal to the areola 902, the inferolateral location distal to the areola 903, the superolateral location distal to the areola 904, the superomedial location proximal to the areola 905, the inferomedial location proximal to the areola 906, the inferolateral location proximal to the areola 907, the superolateral location proximal to the areola 908. In this embodiment, the second electrode of the electrode pair or electrode array is arranged to contact the skin surface of the breast at another one of superomedial location distal to the areola 901, the inferomedial location distal to the areola 902, the inferolateral location distal to the areola 903, the superolateral location distal to the areola 904, the superomedial location proximal to the areola 905, the inferomedial location proximal to the areola 906, the inferolateral location proximal to the areola 907, the superolateral location proximal to the areola 908.

The electrodes of each electrode pair or electrode array may be placed in a common plane that is defined by being parallel to a chest wall, orthogonal to a chest wall, along a line that is defined by a lateral axis, or along a line that is defined by a longitudinal axis. Alternatively, the electrodes of each electrode pair or electrode array may be placed in an oblique plane relative to the chest wall, or oblique to a lateral axis, or oblique to a longitudinal axis. Examples of common planes include a parallel plane including locations 901, 902, 903, 904; a parallel plane including locations 905, 906, 907, 908; an orthogonal plane including locations 901, 904; an orthogonal plane including locations 903, 904; an orthogonal plane including locations 904, 906; an orthogonal plane including locations 903, 905; an orthogonal plane including locations 905, 906; an oblique plane including locations 901, 904, 905, 908; an oblique plane including locations 901, 904, 906, 907; an oblique plane including locations 903, 904, 905, 906, etc. The examples of common planes definable by the locations provided herein are illustrative and non-limiting, and it would be understood that electrode pairs can be placed in locations on the skin surface of the breast in addition to the exemplary locations shown in the drawings, and within common planes which may be parallel, orthogonal or oblique to the chest wall, in addition to the exemplary common planes described herein.

Positioning of the milk flow monitoring sensor on the breast can be indicated via instructions on a software application that is uploaded onto a handheld device such as a cellular phone or a tablet, or light projected on the breast to indicate correct or incorrect positioning, or a visual indicator on the cellular phone that utilizes an on-board camera to assess electrode positions, along with a still photograph or video of the milk flow monitoring sensor on the breast. A secondary positioning device may be used to position or profile the electrodes in an acceptable position. Computer vision algorithms may be used with the breast motion monitor to indicate correct or incorrect positions as display in real-time on a picture or video of the breast.

In operation, the controller 50 generates an excitation signal that is calibrated for breast milk flow. The controller communicates the excitation signal via the first electrode to the surface of the breast.

The second electrode of the milk flow monitors a current response signal that is responsive to an excitation signal that is transferred to the skin of the breast via the first electrode. The bio-impedance spectroscopic analysis accounts for resistance of tissue or subcutaneous fluid under the skin, mammary glands, and milk contained within. As milk flows, is ejected, sucked or expressed out of the breast, bioimpedance values change in relation to fluid leaving the breast. Bioimpedance values can be calibrated to indicate fluid levels of milk in the breast, amount of milk that has left the breast via pumping or feeding by an infant.

Figure 10:
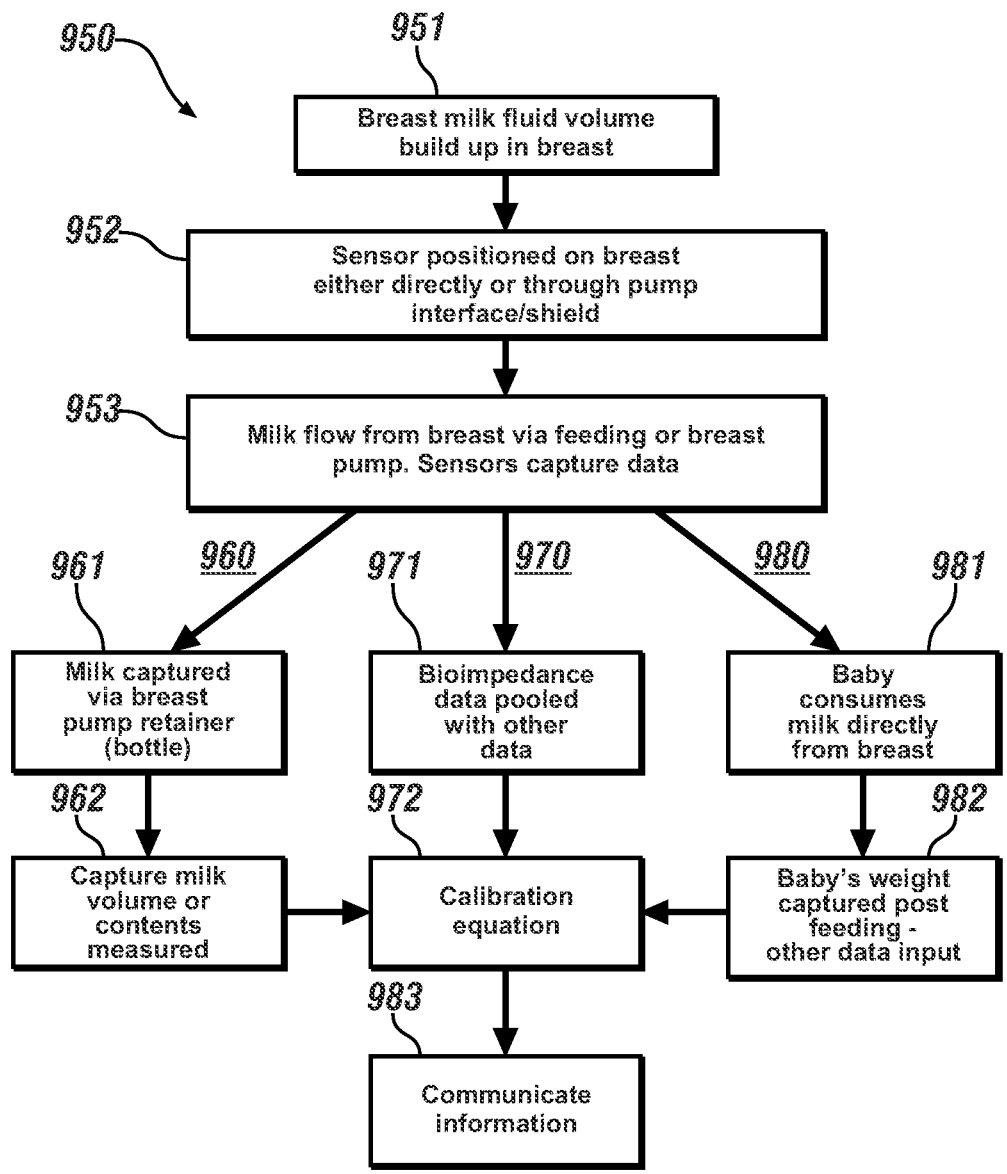
FIG. 10 schematically illustrates a flowchart, in accordance with the disclosure.

FIG. 10 schematically shows a flowchart 950 that is associated with an embodiment of the breast milk flow monitoring system described with reference to FIGS. 1-8, which illustrates actions and information flow related to utilizing an embodiment of the breast milk flow monitoring system to determine breast milk flow in-use.

Prior to milk expression by nursing or pumping, breast milk will build up near the nipple area within the breast in response to an oxytocin release and other factors (Step 951). The breast milk flow monitoring system is positioned on the breast, either directly or through a pump interface or shield (Step 952), and milk flow commences as a result of feeding or pumping, with the milk flow monitoring sensor periodically capturing data (Step 953).

The milk flow monitoring system may include an auto-trigger to commence milk flow monitoring upon detection of milk flow. Alternatively, the milk flow monitoring system may have a manually operated trigger that is activated by the nursing mother. The manually operated trigger may be included on the physical controller 50, or as part of a user application that is executed on a hand-held device.

When milk flow commences as a result of pumping (Step 960), milk is captured via a breast pump retainer or bottle (Step 961), and the captured milk volume and/or milk mass is measured and recorded (Step 962).

When milk flow commences as a result of feeding (Step 980), the infant consumes the milk directly (Step 981), and the infant's mass may be captured post-feeding, along with other data (Step 982). Other data may include, but not be limited to infant weight, weight change, condition of the infant (e.g., alert, sleepy, fussy, etc.), the mother's interpretation of when the infant was actually feeding, and whether or not the infant consumed breast milk during the feeding session.

Analysis of the bio-impedance data may be executed in real-time and/or off-line (Step 970). The bio-impedance data is captured during the milk expression and is pooled with other data, either in the controller or in a cloud environment (Step 971), along with the data from conditions 960 and 980. The data from Steps 960, 980, and 970 is employed to fine-tune the calibration equation (Step 972).

The analysis of the bio-impedance data that is captured during the milk expression may be pooled with other data for calibration development, and pooled with other data, either in the controller or in a cloud environment Information captured and/or derived from the feeding session is communicated to the nursing mother and/or others, via one or more user interfaces that are defined by the user application, and may be accessible via a cellular phone, tablet, computer, etc. The outputted information may include information for each breast (left or right), from a present feeding session, historical data, diurnal analysis, trend data, comparative analysis, etc. (Step 983).

The data from Steps 962, 982 and 971 may be transmitted from the controller to the cloud environment for analysis, calibration, etc. (Step 983). Sensor and/or bio-impedance data may be associated in a database with one or more of the subject infant, the nursing mother, time of day, start time, and elapsed time of nursing or pumping, date, duration of the feeding session, and other data such as body temperature, infant weight, weight change, condition of the infant (e.g., alert, sleepy, fussy, etc.). Data may further be associated with a pool of subject infants and/or subject nursing mothers that are defined as having one or more common parameters, and/or otherwise associated into data grouping for analysis and calibration development.

In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.).

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The use of ordinals such as first, second and third does not necessarily imply a ranked sense of order, but rather may only distinguish between multiple instances of an act or structure.

The term "signal" refers to a physically discernible indicator that conveys information, and may be a suitable waveform (e.g., electrical, optical, magnetic, mechanical or electromagnetic), such as an analog signal, a digital signal, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter may be a discrete value (e.g., either "1" or "0"), a percentage (e.g., 0% to 100%), or an infinitely variable value.

The following Clauses provide example configurations of a breast milk flow monitoring system as disclosed herein.

Clause 1: A breast milk flow monitoring system, comprising: a milk flow monitoring sensor including an array of electrodes including a first electrode, a second electrode, a third electrode and a fourth electrode; and a controller; wherein the first, second, third, and fourth electrodes include electrically conductive surfaces that are arranged to contact a skin surface of a breast; wherein the controller is in communication with the first, second, third, and fourth electrodes; and wherein the controller is operative to: generate a first excitation signal that is communicated via the first electrode to a first location on the breast, generate a second excitation signal that is communicated via the first electrode to the first location on the breast, receive, via one of the second, third or fourth electrodes, a first current response signal in response to the first excitation signal, receive, via the one of the second, third or fourth electrodes, a second current response signal in response to the second excitation signal, execute a bio-impedance spectroscopic analysis of the first excitation signal, the second excitation signal, the first current response signal, and the second current response signal, wherein the bio-impedance spectroscopic analysis is calibrated for breast milk flow, and determine a breast milk flow parameter based upon the bio-impedance spectroscopic analysis.

Clause 2: The breast milk flow monitoring system of clause 1, wherein the first excitation signal comprises a low frequency excitation signal, and wherein the second excitation signal comprises a high frequency excitation signal.

Clause 3: The breast milk flow monitoring system of any of clauses 1 through 2, further comprising the controller operative to: determine a ratio of the first current response signal and the second current response signal; and execute a bio-impedance spectroscopic analysis of the ratio of the first current response signal and the second current response signal, wherein the bio-impedance spectroscopic analysis is calibrated for breast milk flow.

Clause 4: The breast milk flow monitoring system of any of clauses 1 through 3, wherein the controller operative to execute the bio-impedance spectroscopic analysis of the ratio of the first current response signal and the second current response signal comprises the controller operative to: execute a Fourier transform analysis of the bio-impedance spectroscopic analysis of the ratio of the first current response signal and the second current response signal to determine the breast milk flow parameter.

Clause 5: The breast milk flow monitoring system of any of clauses 1 through 4, wherein the controller operative to execute the bio-impedance spectroscopic analysis of the ratio of the first current response signal and the second current response signal comprises the controller operative to: execute a frequency response analysis of the bio-impedance spectroscopic analysis of the ratio of the first current response signal and the second current response signal to determine the breast milk flow parameter.

Clause 6: The breast milk flow monitoring system of any of clauses 1 through 5, wherein the controller operative to execute the bio-impedance spectroscopic analysis of the ratio of the first current response signal and the second current response signal comprises the controller operative to: execute an adaptive filter analysis of the bio-impedance spectroscopic analysis of the ratio of the first current response signal and the second current response signal to determine the breast milk flow parameter.

Clause 7: The breast milk flow monitoring system of any of clauses 1 through 6, wherein the controller operative to execute the bio-impedance spectroscopic analysis of the ratio of the first current response signal and the second current response signal comprises the controller operative to: determine a first parameter associated with at least one of impedance (z), reactance (Xc), resistance (R), and phase (Ph) for the first current response signal; determine a second parameter associated with at least one of impedance (z), reactance (Xc), resistance (R), and phase (Ph) for the second current response signal, determine a ratio of the first parameter and the second parameter, and determine the breast milk flow parameter based upon the ratio of the first parameter and the second parameter.

Clause 8: The breast milk flow monitoring system of any of clauses 1 through 7, wherein the low frequency excitation signal is less than the high frequency excitation signal, wherein the high frequency excitation signal is less than 1000 KHz, and wherein the low frequency excitation signal greater than 3 KHz.

Clause 9: The breast milk flow monitoring system of any of clauses 1 through 8, wherein the low frequency excitation signal comprises a single frequency sine wave having a frequency of less than 50 kHz.

Clause 10: The breast milk flow monitoring system of any of clauses 1 through 9, wherein the high frequency excitation signal comprises a single frequency sine wave having a frequency between 50 kHz and 1000 kHz.

Clause 11: The breast milk flow monitoring system of any of clauses 1 through 10, wherein the first excitation signal comprises a first broad spectrum sine wave, and wherein the second excitation signal comprises a second broad spectrum sine wave.

Clause 12: The breast milk flow monitoring system of any of clauses 1 through 11, wherein the first electrode is arranged to contact the surface of the breast at one of a superomedial location distal to an areola, an inferomedial location distal to the areola, an inferolateral location distal to the areola, a superolateral location distal to the areola, a superomedial location proximal to the areola, an inferomedial location proximal to the areola, an inferolateral location proximal to the areola, or a superolateral location proximal to the areola, and wherein the second electrode is arranged to contact the surface of the breast at another of the superomedial location distal to the areola, the inferomedial location distal to the areola, the inferolateral location distal to the areola, the superolateral location distal to the areola, the superomedial location proximal to the areola, the inferomedial location proximal to the areola, the inferolateral location proximal to the areola, or the superolateral location proximal to the areola.

Clause 13: The breast milk flow monitoring system of any of clauses 1 through 12, wherein the third electrode is arranged to contact the surface of the breast at one of a superomedial location distal to an areola, an inferomedial location distal to the areola, an inferolateral location distal to the areola, a superolateral location distal to the areola, a superomedial location proximal to the areola, an inferomedial location proximal to the areola, an inferolateral location proximal to the areola, or a superolateral location proximal to the areola, and wherein the fourth electrode is arranged to contact the surface of the breast at another of the superomedial location distal to the areola, the inferomedial location distal to the areola, the inferolateral location distal to the areola, the superolateral location distal to the areola, the superomedial location proximal to the areola, the inferomedial location proximal to the areola, the inferolateral location proximal to the areola, or the superolateral location proximal to the areola.

Clause 14: The breast milk flow monitoring system of any of clauses 1 through 13, wherein the milk flow monitoring sensor further comprises the first electrode, the second electrode, the third electrode and the fourth electrode being affixed to a flexible substrate.

Clause 15: The breast milk flow monitoring system of any of clauses 1 through 14, further comprising a conformable holder; wherein the milk flow monitoring sensor is affixed onto the conformable holder; and wherein the conformable holder is arranged to position the first electrode, the second electrode, the third electrode and the fourth electrode in contact with the skin surface of the breast.

Clause 16: The breast milk flow monitoring system of any of clauses 1 through 14, further comprising a temperature sensor affixed onto the conformable holder and arranged to monitor a temperature of the breast; wherein the controller is operative to: receive an input signal from the temperature corresponding to the temperature of the breast, and determine the breast milk flow parameter based upon the bio-impedance spectroscopic analysis of the first excitation signal, the second excitation signal, the first current response signal, the second current response signal, and the temperature of the breast.

Clause 17: The breast milk flow monitoring system of any of clauses 1 through 16, further comprising a movement sensor affixed onto the conformable holder and arranged to monitor physical motion; wherein the controller is operative to: receive an input signal input from the movement sensor associated with physical motion proximal to the sensor, and determine the breast milk flow parameter based upon the bio-impedance spectroscopic analysis of the first excitation signal, the second excitation signal, the first current response signal, the second current response signal, and the physical motion.

Clause 18: The breast milk flow monitoring system of any of clauses 1 through 17, wherein the movement sensor comprises an accelerometer.

Clause 19: The breast milk flow monitoring system of any of clauses 1 through 18, wherein the movement sensor comprises a plurality of accelerometers, wherein the plurality of accelerometers correspond to the first, second, third, and fourth electrodes.

Clause 20: The breast milk flow monitoring system of any of clauses 1 through 19, wherein one of the plurality of accelerometers is arranged to monitor a gross body movement, and wherein one of the plurality of accelerometers is arranged to monitor breast movement.

Clause 21: The breast milk flow monitoring system of any of clauses 1 through 20, wherein the movement sensor comprises a piezoelectric sensor affixed onto the conformable holder proximal to the skin surface of the breast; wherein the controller is operative to receive an input signal from the piezoelectric sensor, and determine the breast milk flow parameter based upon the bio-impedance spectroscopic analysis of the first excitation signal, the second excitation signal, the first current response signal, the second current response signal, and the input signal from the piezoelectric sensor.

Clause 22: The breast milk flow monitoring system of any of clauses 1 through 21, further comprising a strain gage affixed onto the conformable holder proximal to the skin surface of the breast; wherein the controller is operative to: receive an input signal from the strain gage, and determine the breast milk flow parameter based upon the bio-impedance spectroscopic analysis of the first excitation signal, the second excitation signal, the first current response signal, the second current response signal, and the input signal from the strain gage.

Clause 23: The breast milk flow monitoring system of any of clauses 1 through 22, further comprising: a cellular device including an executable application, the cellular device being in communication with a cloud environment; wherein the cellular device is configured to receive the breast milk flow parameter from the controller, wherein the cellular device is configured to communicate the breast milk flow parameter to the cloud environment, and wherein the cellular device is configured to visually display the breast milk flow parameter.

Clause 24: A breast milk flow monitoring system, comprising: a milk flow monitoring sensor including a plurality of electrodes; and a controller; wherein the plurality of electrodes include electrically conductive surfaces that are arranged to contact a skin surface of a breast; wherein the controller is in communication with the plurality of electrodes; and wherein the controller is operative to: generate a first excitation signal that is communicated via a first of the plurality of electrodes to a first location on the breast; generate a second excitation signal that is communicated via the first of the plurality of electrodes to the first location on the breast; receive, via others of the plurality of electrodes, a first current response signal in response to the first excitation signal, receive, via the others of the plurality of electrodes, a second current response signal in response to the second excitation signal, execute a bio-impedance spectroscopic analysis of the first excitation signal, the second excitation signal, the first current response signal, and the second current response signal, wherein the bio-impedance spectroscopic analysis is calibrated for breast milk flow, and determine a breast milk flow parameter based upon the bio-impedance spectroscopic analysis.

Clause 25: A breast milk flow monitoring system, comprising: a milk flow monitoring sensor including an array of electrodes including a first electrode, a second electrode, a third electrode and a fourth electrode; and a controller; wherein the first, second, third, and fourth electrodes include electrically conductive surfaces that are arranged to contact a skin surface of a breast; wherein the controller is in communication with the first, second, third, and fourth electrodes; and wherein the controller is operative to: generate a first excitation signal that is communicated via the first electrode to a first location on the breast, wherein the first excitation signal is calibrated for breast milk flow; generate a second excitation signal that is communicated via the first electrode to the first location on the breast, wherein the second excitation signal is calibrated for breast milk flow; receive, via one of the second, third or fourth electrodes, a first current response signal in response to the first excitation signal, receive, via the one of the second, third or fourth electrodes, a second current response signal in response to the second excitation signal, execute a bio-impedance spectroscopic analysis of the first excitation signal, the second excitation signal, the first current response signal, and the second current response signal, wherein the bio-impedance spectroscopic analysis is calibrated for breast milk flow, and determine a breast milk flow parameter based upon the bio-impedance spectroscopic analysis.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A breast milk flow monitoring system, comprising:
a milk flow monitoring sensor including an array of electrodes including a first electrode, a second electrode, a third electrode and a fourth electrode, and
a controller;
wherein the first, second, third, and fourth electrodes include electrically conductive surfaces that are configured to be arranged to contact a skin surface of a breast;
wherein the controller is in communication with the first, second, third, and fourth electrodes; and
wherein the controller is operative to:
generate a first excitation signal that is communicated via the first electrode to a first location on the breast,
generate a second excitation signal that is communicated via the first electrode to the first location on the breast,
wherein the first excitation signal comprises a low frequency excitation signal and wherein the second excitation signal comprises a high frequency excitation signal;
receive, via one of the second, third or fourth electrodes, a first current response signal in response to the first excitation signal,
receive, via the one of the second, third or fourth electrodes, a second current response signal in response to the second excitation signal,
determine a ratio of the first current response signal and the second current response signal
execute a bio-impedance spectroscopic analysis of the ratio of the first current response signal and the second current response signal, wherein the bio-impedance spectroscopic analysis is calibrated for breast milk flow, and
determine a breast milk flow parameter based upon the bio-impedance spectroscopic analysis;
wherein the controller operative to execute the bio-impedance spectroscopic analysis of the ratio of the first current response signal and the second current response signal includes the controller being operative to:
determine a first parameter associated with at least one of impedance (z), reactance (Xc), resistance (R), and phase (Ph) for the first current response signal,
determine a second parameter associated with at least one of impedance (z), reactance (Xc), resistance (R), and phase (Ph) for the second current response signal,
determine a ratio of the first parameter and the second parameter, and
determine the breast milk flow parameter based upon the ratio of the first parameter and the second parameter.

2. The breast milk flow monitoring system of claim 1, wherein the controller operative to execute the bio-impedance spectroscopic analysis of the ratio of the first current response signal and the second current response signal comprises the controller operative to:
execute a Fourier transform analysis of the bio-impedance spectroscopic analysis of the ratio of the first current response signal and the second current response signal to determine the breast milk flow parameter.

3. The breast milk flow monitoring system of claim 1, wherein the controller operative to execute the bio-impedance spectroscopic analysis of the ratio of the first current response signal and the second current response signal comprises the controller operative to:
execute a frequency response analysis of the bio-impedance spectroscopic analysis of the ratio of the first current response signal and the second current response signal to determine the breast milk flow parameter.

4. The breast milk flow monitoring system of claim 1, wherein the controller operative to execute the bio-impedance spectroscopic analysis of the ratio of the first current response signal and the second current response signal comprises the controller operative to:
execute an adaptive filter analysis of the bio-impedance spectroscopic analysis of the ratio of the first current response signal and the second current response signal to determine the breast milk flow parameter.

5. The breast milk flow monitoring system of claim 1, wherein the low frequency excitation signal is less than the high frequency excitation signal, wherein the high frequency excitation signal is less than 1000 KHz, and wherein the low frequency excitation signal greater than 3 KHz.

6. The breast milk flow monitoring system of claim 1, wherein the low frequency excitation signal comprises a single frequency sine wave having a frequency of less than 50 kHz.

7. The breast milk flow monitoring system of claim 1, wherein the high frequency excitation signal comprises a single frequency sine wave having a frequency between 50 kHz and 1000 kHz.

8. The breast milk flow monitoring system of claim 1, wherein the first excitation signal comprises a first broad spectrum sine wave, and wherein the second excitation signal comprises a second broad spectrum sine wave.

9. The breast milk flow monitoring system of claim 1, wherein the first electrode is configured to be arranged to contact the surface of the breast at one of a superomedial location distal to an areola, an inferomedial location distal to the areola, an inferolateral location distal to the areola, a superolateral location distal to the areola, a superomedial location proximal to the areola, an inferomedial location proximal to the areola, an inferolateral location proximal to the areola, or a superolateral location proximal to the areola, and
wherein the second electrode is configured to be arranged to contact the surface of the breast at another of the superomedial location distal to the areola, the inferomedial location distal to the areola, the inferolateral location distal to the areola, the superolateral location distal to the areola, the superomedial location proximal to the areola, the inferomedial location proximal to the areola, the inferolateral location proximal to the areola, or the superolateral location proximal to the areola.

10. The breast milk flow monitoring system of claim 1, wherein the third electrode is configured to be arranged to contact the surface of the breast at one of a superomedial location distal to an areola, an inferomedial location distal to the areola, an inferolateral location distal to the areola, a superolateral location distal to the areola, a superomedial location proximal to the areola, an inferomedial location proximal to the areola, an inferolateral location proximal to the areola, or a superolateral location proximal to the areola, and
wherein the fourth electrode is configured to be arranged to contact the surface of the breast at another of the superomedial location distal to the areola, the inferomedial location distal to the areola, the inferolateral location distal to the areola, the superolateral location distal to the areola, the superomedial location proximal to the areola, the inferomedial location proximal to the areola, the inferolateral location proximal to the areola, or the superolateral location proximal to the areola.

11. The breast milk flow monitoring system of claim 1, wherein the milk flow monitoring sensor further comprises the first electrode, the second electrode, the third electrode and the fourth electrode being affixed to a flexible substrate.

12. The breast milk flow monitoring system of claim 1, further comprising a conformable holder;
wherein the milk flow monitoring sensor is affixed onto the conformable holder; and
wherein the conformable holder is arranged to position the first electrode, the second electrode, the third electrode and the fourth electrode in contact with the skin surface of the breast.

13. The breast milk flow monitoring system of claim 12, further comprising a temperature sensor affixed onto the conformable holder and arranged to monitor a temperature of the breast;
wherein the controller is operative to:
receive an input signal from the temperature sensor corresponding to the temperature of the breast, and
determine the breast milk flow parameter based upon the bio-impedance spectroscopic analysis of the first excitation signal, the second excitation signal, the first current response signal, the second current response signal, and the temperature of the breast.

14. The breast milk flow monitoring system of claim 12, further comprising a movement sensor affixed onto the conformable holder and arranged to monitor physical motion,
wherein the controller is operative to:
receive an input signal from the movement sensor associated with physical motion proximal to the movement sensor, and
determine the breast milk flow parameter based upon the bio-impedance spectroscopic analysis of the first excitation signal, the second excitation signal, the first current response signal, the second current response signal, and the physical motion.

15. The breast milk flow monitoring system of claim 14, wherein the movement sensor comprises an accelerometer.

16. The breast milk flow monitoring system of claim 14, wherein the movement sensor comprises a plurality of accelerometers, wherein the plurality of accelerometers correspond to the first, second, third, and fourth electrodes.

17. The breast milk flow monitoring system of claim 16, wherein one of the plurality of accelerometers is arranged to monitor a gross body movement, and wherein one of the plurality of accelerometers is arranged to monitor breast movement.

18. The breast milk flow monitoring system of claim 14, wherein the movement sensor comprises a piezoelectric sensor affixed onto the conformable holder proximal to the skin surface of the breast; wherein the controller is operative to receive an input signal from the piezoelectric sensor, and determine the breast milk flow parameter based upon the bio-impedance spectroscopic analysis of the first excitation signal, the second excitation signal, the first current response signal, the second current response signal, and the input signal from the piezoelectric sensor.

19. The breast milk flow monitoring system of claim 12, further comprising a strain gage affixed onto the conformable holder proximal to the skin surface of the breast;
  wherein the controller is operative to:
    receive an input signal from the strain gage, and
    determine the breast milk flow parameter based upon the bio-impedance spectroscopic analysis of the first excitation signal, the second excitation signal, the first current response signal, the second current response signal, and the input signal from the strain gage.

20. The breast milk flow monitoring system of claim 1, further comprising:
  a cellular device including an executable application, the cellular device being in communication with a cloud environment;
  wherein the cellular device is configured to receive the breast milk flow parameter from the controller,
  wherein the cellular device is configured to communicate the breast milk flow parameter to the cloud environment, and
  wherein the cellular device is configured to visually display the breast milk flow parameter.

\* \* \* \* \*